(12) United States Patent
Lin et al.

(10) Patent No.: US 8,880,563 B2
(45) Date of Patent: Nov. 4, 2014

(54) IMAGE SEARCH BY QUERY OBJECT SEGMENTATION

(71) Applicants: Zhe Lin, Fremont, CA (US); Jonathan W. Brandt, Santa Cruz, CA (US)

(72) Inventors: Zhe Lin, Fremont, CA (US); Jonathan W. Brandt, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 39 days.

(21) Appl. No.: 13/624,615

(22) Filed: Sep. 21, 2012

(65) Prior Publication Data

US 2014/0089326 A1   Mar. 27, 2014

(51) Int. Cl.
*G06F 17/30* (2006.01)
*G06K 9/00* (2006.01)

(52) U.S. Cl.
USPC .......................................... 707/802; 328/128

(58) Field of Classification Search
None
See application file for complete search history.

(56) References Cited

U.S. PATENT DOCUMENTS

| | | | |
|---|---|---|---|
| 4,790,564 A * | 12/1988 | Larcher et al. ................. | 283/69 |
| 5,579,471 A | 11/1996 | Barber et al. | |
| 5,911,139 A | 6/1999 | Jain et al. | |
| 6,035,055 A | 3/2000 | Wang et al. | |
| 6,480,840 B2 | 11/2002 | Zhu et al. | |
| 6,483,938 B1 * | 11/2002 | Hennessey et al. ........... | 382/149 |
| 6,563,959 B1 | 5/2003 | Troyanker | |
| 6,594,386 B1 | 7/2003 | Golshani et al. | |
| 6,691,126 B1 | 2/2004 | Syeda-Mahmood | |
| 6,757,686 B1 | 6/2004 | Syeda-Mahmood et al. | |
| 6,990,233 B2 | 1/2006 | Park et al. | |
| 7,320,000 B2 | 1/2008 | Chitrapura et al. | |
| 7,702,673 B2 * | 4/2010 | Hull et al. ..................... | 707/707 |
| 7,756,341 B2 | 7/2010 | Perronnin | |
| 7,899,252 B2 | 3/2011 | Boncyk et al. | |
| 7,962,128 B2 | 6/2011 | Neven et al. | |
| 8,055,103 B2 | 11/2011 | Fu et al. | |
| 8,401,292 B2 | 3/2013 | Park et al. | |
| 8,429,168 B1 | 4/2013 | Chechik et al. | |
| 8,442,321 B1 | 5/2013 | Chang et al. | |
| 8,472,664 B1 * | 6/2013 | Jing et al. ...................... | 382/100 |
| 8,478,052 B1 | 7/2013 | Yee et al. | |
| 8,781,255 B2 | 7/2014 | Lin et al. | |
| 8,805,116 B2 | 8/2014 | Lin et al. | |
| 2002/0050094 A1 | 5/2002 | Taulbee | |

(Continued)

FOREIGN PATENT DOCUMENTS

GB        2388761        1/2004

OTHER PUBLICATIONS

Sivic, J., Zisserman, A., "Video google: A text retrieval approach to object matching in videos," In: ICCV., Proceedings of the Ninth IEEE International Conference on Computer Vision (ICCV 2003) 2-Volume Set, pp. 1-8.

(Continued)

*Primary Examiner* — Tarek Chbouki
(74) *Attorney, Agent, or Firm* — Wolfe-SBMC

(57) ABSTRACT

Query object localization, segmentation, and retrieval are disclosed. A query image may be received that includes a query object. Based on respective spatially constrained similarity measures between the query image and a plurality of images from an image database, at least some of the plurality of images may be identified and/or retrieved and a location of the query object in the query image may be estimated. The query object may then be automatically segmented from the query image based on the estimated query object location. In some embodiments, the retrieval, localization and/or segmentation may be iterated.

20 Claims, 12 Drawing Sheets

(56) References Cited

U.S. PATENT DOCUMENTS

| | | |
|---|---|---|
| 2002/0168117 A1 | 11/2002 | Lee et al. |
| 2002/0184203 A1 | 12/2002 | Nastar et al. |
| 2004/0002931 A1 | 1/2004 | Platt et al. |
| 2004/0062435 A1* | 4/2004 | Yamaoka et al. ............. 382/159 |
| 2004/0103101 A1 | 5/2004 | Stubler et al. |
| 2004/0190613 A1* | 9/2004 | Zhu et al. ................. 375/240.12 |
| 2005/0105792 A1 | 5/2005 | Cao et al. |
| 2005/0259737 A1* | 11/2005 | Chou et al. ............... 375/240.16 |
| 2006/0112042 A1 | 5/2006 | Platt et al. |
| 2006/0204079 A1 | 9/2006 | Yamaguchi |
| 2006/0290950 A1 | 12/2006 | Platt et al. |
| 2007/0127813 A1 | 6/2007 | Shah |
| 2007/0179921 A1 | 8/2007 | Zitnick et al. |
| 2008/0199044 A1* | 8/2008 | Tsurumi ....................... 382/103 |
| 2008/0304743 A1 | 12/2008 | Tang et al. |
| 2009/0210413 A1 | 8/2009 | Hayashi et al. |
| 2009/0232409 A1 | 9/2009 | Marchesotti |
| 2009/0297032 A1 | 12/2009 | Loui et al. |
| 2009/0299999 A1 | 12/2009 | Loui et al. |
| 2010/0166339 A1 | 7/2010 | Gokturk et al. |
| 2010/0169323 A1 | 7/2010 | Liu et al. |
| 2010/0191722 A1 | 7/2010 | Boiman et al. |
| 2010/0208983 A1 | 8/2010 | Iwai et al. |
| 2010/0284577 A1 | 11/2010 | Hua et al. |
| 2011/0040741 A1 | 2/2011 | Korte et al. |
| 2011/0075927 A1 | 3/2011 | Xu et al. |
| 2011/0115921 A1 | 5/2011 | Wang et al. |
| 2011/0116711 A1 | 5/2011 | Wang et al. |
| 2011/0143707 A1* | 6/2011 | Darby et al. ............... 455/404.2 |
| 2011/0150320 A1* | 6/2011 | Ramalingam et al. ........ 382/154 |
| 2011/0182477 A1 | 7/2011 | Tamrakar et al. |
| 2011/0235923 A1* | 9/2011 | Weisenburger et al. ...... 382/201 |
| 2011/0293187 A1 | 12/2011 | Sarkar et al. |
| 2011/0314049 A1 | 12/2011 | Poirier et al. |
| 2012/0117069 A1 | 5/2012 | Kawanishi et al. |
| 2012/0158685 A1 | 6/2012 | White et al. |
| 2012/0158716 A1 | 6/2012 | Zwol et al. |
| 2012/0170804 A1 | 7/2012 | Lin et al. |
| 2012/0243789 A1 | 9/2012 | Yang et al. |
| 2012/0269432 A1 | 10/2012 | Wang et al. |
| 2012/0294477 A1 | 11/2012 | Yang et al. |
| 2013/0060765 A1 | 3/2013 | Lin |
| 2013/0060766 A1 | 3/2013 | Lin |
| 2013/0121570 A1 | 5/2013 | Lin |
| 2013/0121600 A1 | 5/2013 | Lin |
| 2013/0132377 A1 | 5/2013 | Lin et al. |
| 2013/0163874 A1 | 6/2013 | Schechtman et al. |
| 2013/0273968 A1* | 10/2013 | Rhoads et al. ............. 455/556.1 |
| 2014/0003719 A1* | 1/2014 | Bai et al. ...................... 382/173 |
| 2014/0010407 A1* | 1/2014 | Sinha et al. .................. 382/103 |

OTHER PUBLICATIONS

Philbin, J., Chum, O., Isard, M., Sivic, J., Zisserman, A., Object retrieval with large vocabularies and fast spatial matching. In: CVPR. (2007), pags 1-8.

Z. Wu, Q. Ke, M. Isard, and J. Sun. Bundling features for large scale partial-duplicate web image search. In CVPR, 2009, Microsoft Research, pp. 1-8.

Z. Lin and J. Brandt. A local bag-of-features model for large-scale object retrieval. In ECCV, 2010, Springer-Verlag Berlin Heidelberg, pp. 294-308.

Y. Cao, C. Wang, Z. Li, L. Zhang, and L. Zhang. Spatial-bag-of-features. IEEE, In CVPR, 2010, pp. 1-8.

O. Chum and J. Matas. Unsupervised discovery of co-occurrence in sparse high dimensional data. In CVPR, 2010, pp. 1-8.

O. Chum, A. Mikulik, M. Perd'och, and J. Matas. Total recall II: Query expansion revisited. In CVPR, 2011, pp. 889-896.

O. Chum, M. Perd'och, and J. Matas. Geometric min-hashing: Finding a (thick) needle in a haystack. IEEE, in CVPR, 2009, pp. 17-24.

O. Chum, J. Philbin, J. Sivic, M. Isard, and A. Zisserman. Total recall: Automatic query expansion with a generative feature model for object retrieval. In ICCV, 2007, pp. 1-8.

H. Jegou, M. Douze, and C. Schmid. Hamming embedding and weak geometric consistency for large scale image search. In ECCV, 2008, Author manuscript, published in "10th European Conference on Computer Vision (ECCV '08) 5302 (2008) 304-317".

H. Jegou, M. Douze, and C. Schmid. On the burstiness of visual elements. In CVPR, 2009, Author manuscript, published in "IEEE Conference on Computer Vision and Pattern Recognition (CVPR '09) (2009) 1169-1176".

H. Jegou, M. Douze, C. Schmid, and P. Perez. Aggregating local descriptors into a compact image representation. In CVPR, Author manuscript, published in 23rd IEEE Conference on Computer Vision & Pattern Recognition (CVPR '10) (2010) 3304--3311.

H. Jegou, H. Harzallah, and C. Schmid. A contextual dissimilarity measure for accurate and efficient image search. In CVPR, 2007, Author manuscript, published in Conference on Computer Vision & Pattern Recognition (CVPR '07) (2007) pp. 1-8.

H. Jegou, C. Schmid, H. Harzallah, and J. Verbeek. Accurate image search using the contextual dissimilarity measure. Author manuscript, published in IEEE Transactions on Pattern Analysis and Machine Intelligence 32, 1 (2010) 2-11.

C. H. Lampert. Detecting objects in large image collections and videos by efficient subimage retrieval. In ICCV, 2009, pp. 1-8.

D. G. Lowe. Distinctive image features from scale-invariant keypoints. IJCV, 60(2):91-110, Received Jan. 10, 2003; Revised Jan. 7, 2004; Accepted Jan. 22, 2004, 2004, pp. 1-20.

A. Mikulik, M. Perd'och, O. Chum, and J. Matas. Learning a fine vocabulary. In ECCV, 2010, pp. 1-14.

M. Muja and D. G. Lowe. Fast approximate nearest neighbors with automatic algorithm configuration. In VISAPP, 2009, pp. 1-10.

D. Nister and H. Stewenius. Scalable recognition with a vocabulary tree. In CVPR, 2006, pp. 1-8.

M. Perd'och, O. Chum, and J. Matas. Efficient representation of local geometry for large scale object retrieval. In CVPR, 2009, pp. 1-8.

J. Philbin, O. Chum, M. Isard, J. Sivic, and A. Zisserman. Lost in quantization: Improving particular object retrieval in large scale image databases. In CVPR, 2008, pp. 1-8.

J. Philbin, M. Isard, J. Sivic, and A. Zisserman. Descriptor learning for efficient retrieval. In ECCV, 2010, pp. 1-14.

D. Qin, S. Gammeter, L. Bossard, T. Quack, and L. VanGool. Hello neighbor: accurate object retrieval with k-reciprocal nearest neighbors. In CVPR, 2011, pp. 1-8.

J. Yuan, Y. Wu, and M. Yang. Discovery of collocation patterns: from visual words to visual phrases. IEEE, In CVPR, 2007, pp. 1-8.

Y. Zhang, Z. Jia, and T. Chen. Image retrieval with geometry-preserving visual phrases. In CVPR, 2011, pp. 809-816.

U.S. Appl. No. 12/869,460, filed Aug. 26, 2010, Zhe Lin, et al.

U.S. Appl. No. 13/552,595, filed Jul. 18, 2012, Zhe Lin, et al.

U.S. Appl. No. 13/434,028, filed Mar. 29, 2012, Zhe Lin, et al.

Leibe, B., Leonardis, A., Schiele, B.: Combined object categorization and segmentation with an implicit shape model. In: ECCV Workshop on Statistical Learning in Computer Vision. (2004), pp. 1-16.

Google Mobile, "Coogle Goggles," downloaded from http://www.google.com/mobile/goggles/#text on Sep. 28, 2012, (c)2011 Google, 1 page.

Amazon, "A9.com Innovations in Search Technologies—Flow," downloaded from http://flow.a9.com on Sep. 28, 2012, (c) 2003-2011 A9.com, Inc. 1 page.

Xiaohui Shen, et al., "Object retrieval and localization with spatially-constrained similarity measure and k-NN re-ranking," Jun. 16-21, 2012, 2012 IEEE Conference on Computer Vision and Pattern Recognition (CVPR), pp. 1-8.

Tom Yeh, et al., "Fast concurrent object localization and recognition," In: CVPR. 2009 IEEE, pp. 280-287.

He, J., Lin, T.H., Feng, J., Chang, S.F., "Mobile product search with bag of hash bits,". In: ACM MM. (2011), pp. 1-8.

Griffin, G., Holub, A., Perona, P., "Caltech-256 object category dataset," Technical Report 7694, California Institute of Technology (2007), pp. 1-20.

Wang, X., Yang, M., Cour, T., Zhu, S., Yu, K., Han, T.X.: Contextual weighting for vocabulary tree based image retrieval. In: ICCV. (2011), pp. 1-8.

Jing, Y., Baluja, S.: Pagerank for product image search. In: WWW 2008 / Refereed Track: Rich Media (2008), pp. 1-9.

(56) References Cited

OTHER PUBLICATIONS

Lin, X., Gokturk, B., Sumengen, B., Vu, D.: Visual search engine for product images. In: Multimedia Content Access: Algorithms and Systems II. 2008 SPIE Digital Library, pp. 1-9.

Girod, B., Chandrasekhar, V., Chen, D., Cheung, N.M., Grzeszczuk, R., Reznik, Y., Takacs, G., Tsai, S., Vedantham, R.: Mobile visual search. IEEE Signal Processing Magazine 28 (2011), pp. 1-11.

Chandrasekhar, V., Chen, D., Tsai, S., Cheung, N.M., Chen, H., Takacs, G., Reznik, Y., Vedantham, R., Grzeszczuk, R., Bach, J., Girod, B.: The stanford mobile visual search dataset. In: ACM Multimedia Systems Conference. (2011), pp. 1-6.

Rother, C., Kolmogorov, V., Blake, A.: Grabcut: Interactive foreground extraction using iterated graph cuts. In: SIGGRAPH. (2004), pp. 1-6.

Batra, D., Kowdle, A., Parikh, D., Luo, J., Chen, T.: icoseg: Interactive cosegmentation with intelligent scribble guidance. In: CVPR. (2010), pp. 1-8.

Rother, C., Kolmogorov, V., Minka, T., Blake, A.: Cosegmentation of image pairs by histogram matchingincorporating a global constraint into mrfs. In: CVPR. (2006), pp. 1-8.

Bourdev, L.D., Malik, J.: Poselets: Body part detectors trained using 3d human pose annotations. In: ICCV. (2009), pp. 1-8.

Brox, T., Bourdev, L.D., Maji, S., Malik, J.: Object segmentation by alignment of poselet activations to image contours. In: CVPR. (2011), pp. 2225-2232.

Wu, B., Nevatia, R.: Simultaneous object detection and segmentation by boosting local shape feature based classifier. In: CVPR. (2007), pp. 1-8.

Opelt, A., Zisserman, A.: A boundary fragment model for object detection. In: ECCV. (2006), pp. 1-14.

U.S. Appl. No. 13/434,061, filed Mar. 29, 2012, Zhe Lin, et al.

"Final Office Action", U.S. Appl. No. 13/552,595, (Nov. 12, 2013), 15 pages.

"Non-Final Office Action", U.S. Appl. No. 12/869,460, (Sep. 24, 2013), 18 pages.

"Non-Final Office Action", U.S. Appl. No. 13/434,028, (Oct. 1, 2013), 22 pages.

"Non-Final Office Action", U.S. Appl. No. 13/434,061, (Oct. 23, 2013), 25 pages.

Fulkerson, et al., "Localizing Objects with Smart Dictionaries", *Proceedings of the 10th European Conference on Computer Vision: Part I*, (Oct. 2008), pp. 179-192.

Grauman, Kristen "Indexing with local features, Bag of words models", *UT-Austin*. Retrieved from <http://www.cs.utexas.edu/~grauman/courses/fall2009/slides/lecture16_bow.pdf>, (Oct. 29, 2009), 39 pages.

Jegou, et al., "Improving bag-of-features for large scale image search", *International Journal of Computer Vision*, vol. 87 Issue 3, (Mar. 15, 2011), 21 pages.

Lazebnik, Svetlana et al., "Beyond Bags of Features: Spatial Pyramid Matching for Recognizing Natural Scene Categories", *CVPR*, (Jun. 2006), 8 pages.

Vailaya, et al., "Image Classification for Content-Based Indexing", *IEEE Transactions on Image Processing*, vol. 10 Issue 1, (Jan. 2001), pp. 117-130.

"Non-Final Office Action", U.S. Appl. No. 13/552,595, (Jul. 30, 2013), 13 pages.

"Non-Final Office Action", U.S. Appl. No. 13/552,596, (Aug. 6, 2013), 11 pages.

"Final Office Action", U.S. Appl. No. 12/869,460, (Dec. 14, 2012), 17 pages.

"Non-Final Office Action", U.S. Appl. No. 12/869,460, (Jun. 18, 2012), 13 pages.

"U.S. Application as Filed", U.S. Appl. No. 13/552,596, (Jul. 18, 2012), 61 pages.

"Corrected Notice of Allowance", U.S. Appl. No. 13/434,061, May 23, 2014, 4 pages.

"Final Office Action", U.S. Appl. No. 12/869,460, Dec. 31, 2013, 20 pages.

"Final Office Action", U.S. Appl. No. 13/552,596, Dec. 26, 2013, 14 pages.

"Notice of Allowance", U.S. Appl. No. 13/434,028, Mar. 28, 2014, 7 pages.

"Notice of Allowance", U.S. Appl. No. 13/434,061, Mar. 12, 2014, 8 pages.

Albuz, et al.,' "Scalable Color Image Indexing and Retrieval Using Vector Wavelets", IEEE Transactions on Knowledge and Data Engineering, vol. 13, No. 5, Sep. 2001, pp. 851-861.

"Non-Final Office Action", U.S. Appl. No. 13/552,596, Jul. 22, 2014, 13 pages.

"Notice of Allowance", U.S. Appl. No. 13/552,595, Jul. 18, 2014, 9 pages.

\* cited by examiner

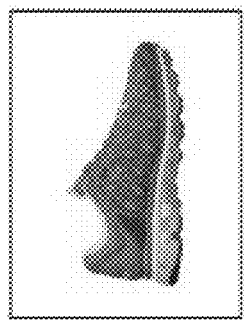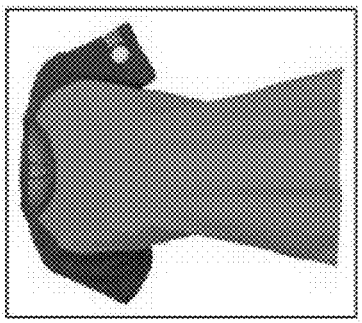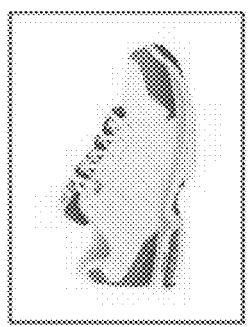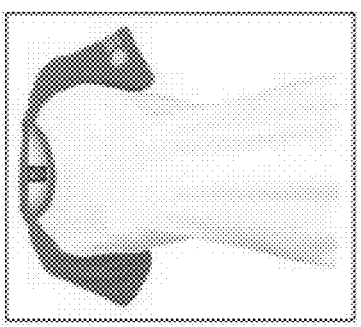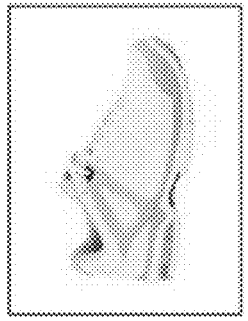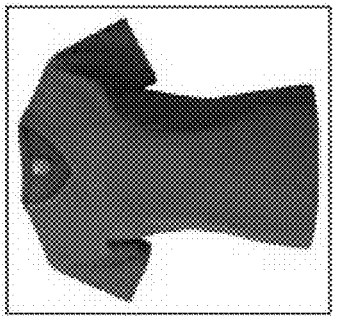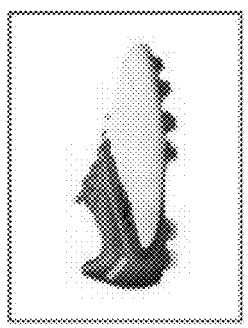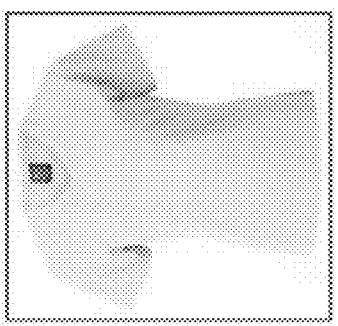
FIG. 4A
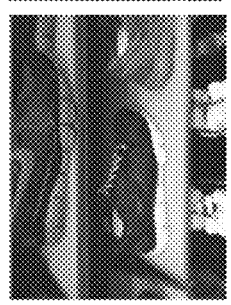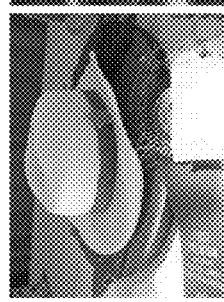
FIG. 4B

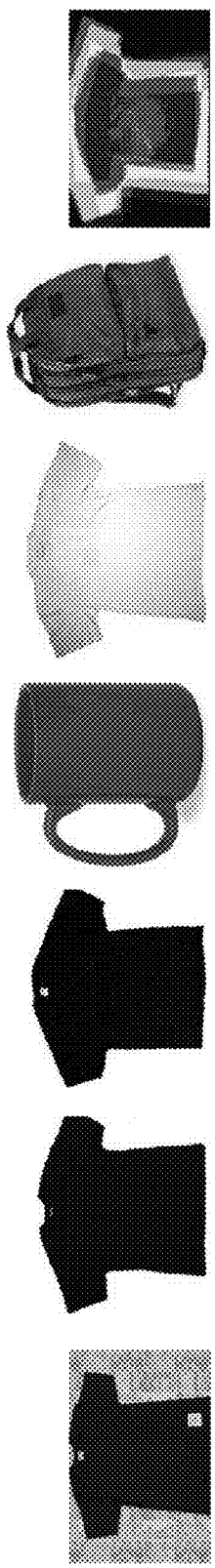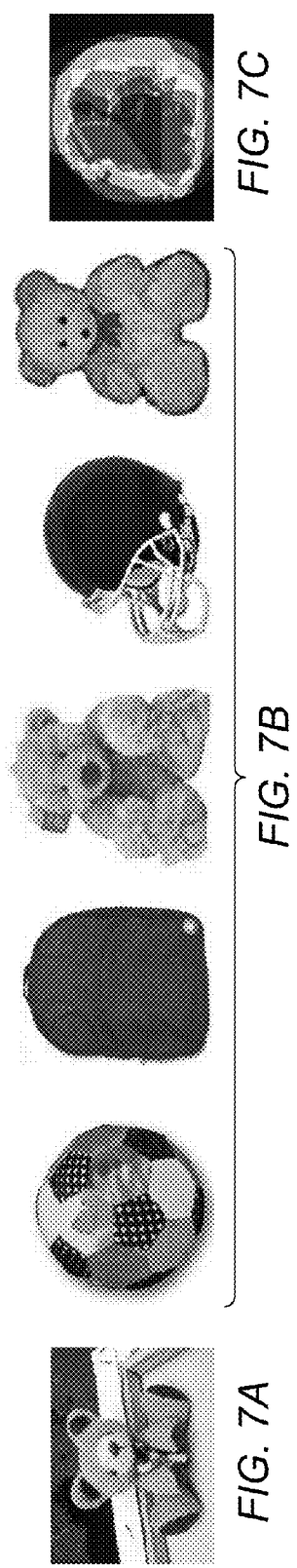

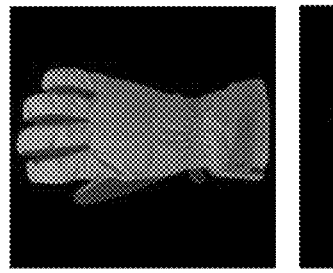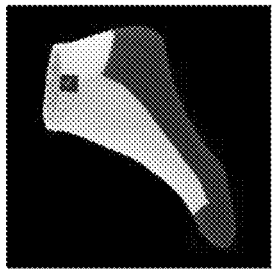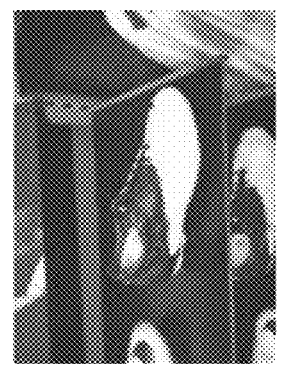
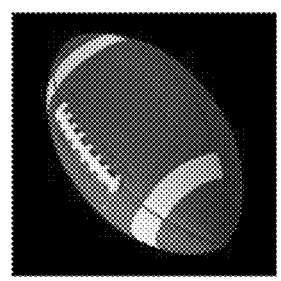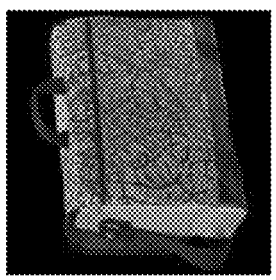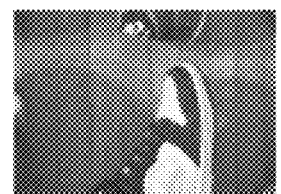
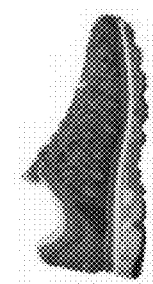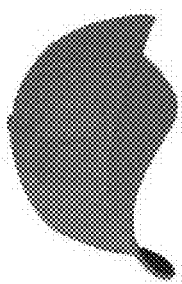
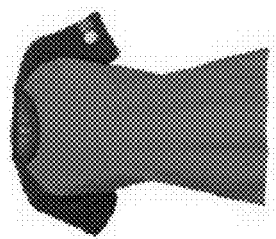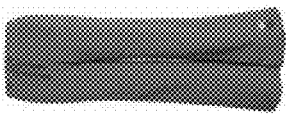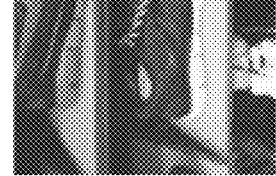
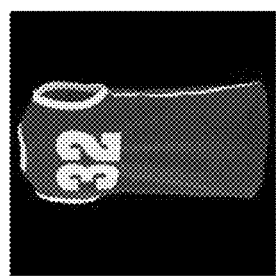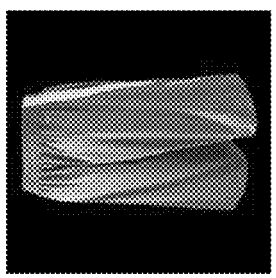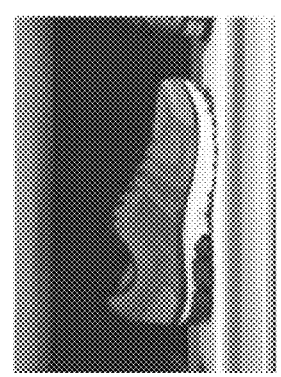
FIG. 8A
FIG. 8B

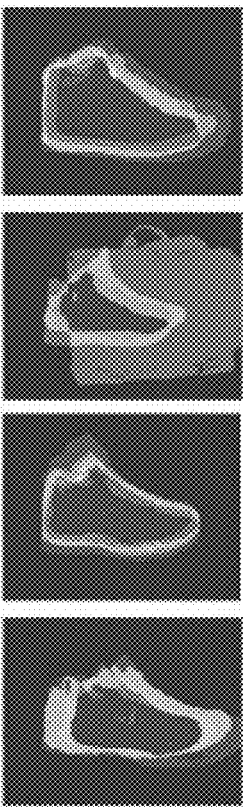
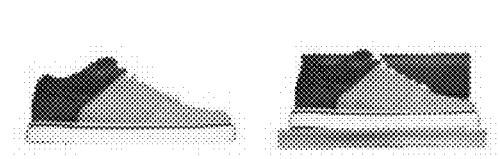
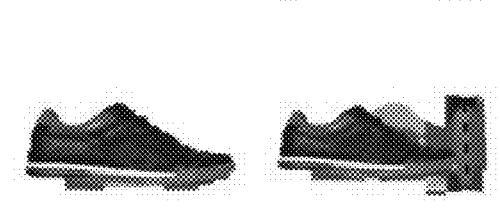
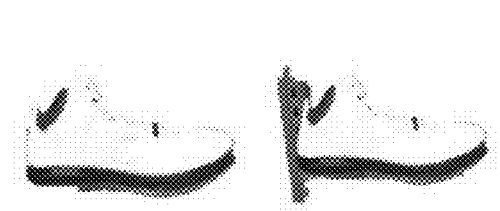
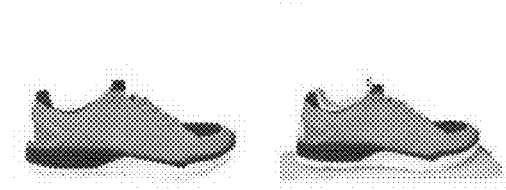
FIG. 11A   FIG. 11B   FIG. 11C   FIG. 11D

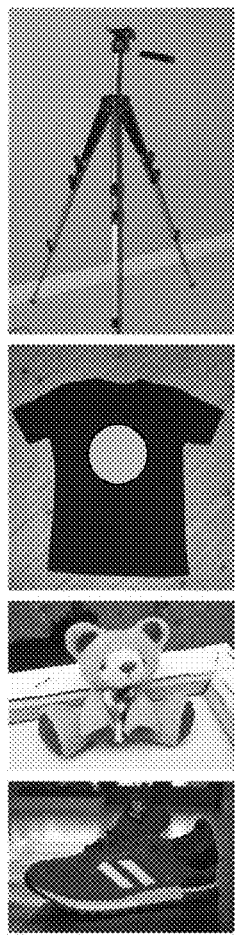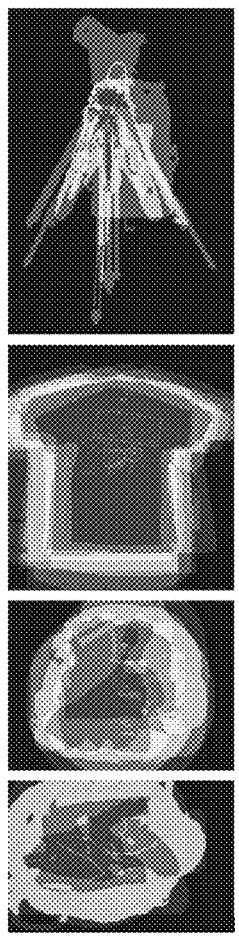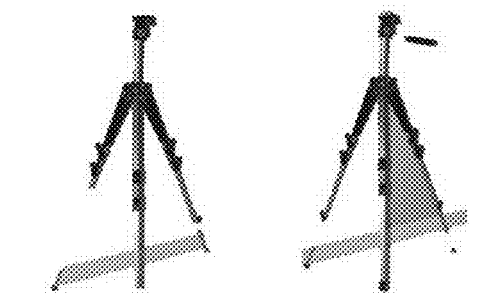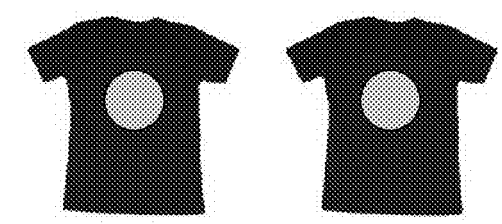
FIG. 12A   FIG. 12B   FIG. 12C   FIG. 12D

IMAGE SEARCH BY QUERY OBJECT SEGMENTATION

BACKGROUND

Image and object retrieval has been an active research topic for decades due to its desired applications in, for example, web image search, mobile visual search (e.g., mobile product image search on a mobile device) and personal photo management. Many conventional retrieval techniques adopt the bag-of-words (BOW) model. In the bag-of-words model, a visual vocabulary is first built by clustering on a large collection of local features such as scale-invariant feature transform (SIFT) features. In the retrieval stage, each extracted feature from the query is assigned to its closest visual word in the vocabulary. The query image is accordingly represented by a global histogram of visual words, and matched with database images by tf-idf weighting using inverted files.

A fundamental problem in object retrieval techniques using the bag-of-words model is its lack of spatial information. Various techniques have been proposed to incorporate spatial constraints into the bag-of-words model to improve the retrieval accuracy. However, these techniques tend to be too strict or only encode weak constraints so that they only partially solve the problem for limited cases. While the bag-of-words model works generally well benefiting from its effective feature representation and indexing schemes with inverted files, it still suffers from problems including but not limited to, the loss of information (especially spatial information) when representing the images as histograms of quantized features, and the deficiency of features' discriminative power, either because of the degradation caused by feature quantization, or due to its intrinsic incapability to tolerate large variation of object appearance.

As a result, the BOW model does not work well for certain applications (e.g., mobile product image search) where the objects (e.g., products) in the database images are mostly well aligned and captured in studio environments with controlled lighting. The background is often clean and texture details are clear. See FIG. 4A for an example of a database image. The BOW model also does not work well when the query images are taken under different lighting conditions than the database images and/or with a clustered background. In such situations, large viewpoint variations may exist between the query and database images. Moreover, motion blur and out-of-focus blur are common in query images captured by mobile phones and may further degrade a BOW model. See FIG. 4B for example query images taken by a mobile device. The BOW model may also struggle for objects that are non-planar (e.g., shoes) and/or less textured (e.g., clothing). Therefore, standard RANSAC-based verification can fail. The BOW model may additionally not perform well for objects that are visually similar to each other, such as shoes. For such objects, only a small portion of visual features can discriminate them so a fine-grained discrimination strategy is needed for correct identification.

Moreover, when a BOW model is used to perform certain object retrieval tasks, the results may be negatively affected by features extracted from the background of the query images. Even when the location of the object is specified in the query image, the features around the occluding boundaries of the object may still be largely different from those extracted from clean background. The query object of the query image may be segmented by manual labeling. However, simple labeling (e.g., specifying the object by a bounding rectangle) can yield inaccurate segmentation results and/or be overly burdensome for users.

SUMMARY

Various embodiments of methods, apparatus, and computer-readable storage media for query object localization, segmentation, and image retrieval are described. In some embodiments, a query image may be received that includes a query object. A location of the query object in the query image may be unspecified. Based on respective spatially constrained similarity measures between the query image and a plurality of images from an image database, at least some of the plurality of images may be identified and/or retrieved (e.g., those that share a common feature with the query image). In various embodiments, a location of the query object in the query image may be estimated based on the respective spatially constrained similarity measures. The query object may then be automatically segmented from the query image based on the estimated location. In some embodiments, the image retrieval, localization, and segmentation may be iterated.

BRIEF DESCRIPTION OF THE DRAWINGS

FIGS. 4A and 4B show examples of database images and query images, respectively.

FIGS. 6A-6C and 7A-7C graphically illustrate the query object localization and extraction process, according to at least some embodiments.

FIGS. 8A and 8B illustrate example database images and query images, respectively, that were used in an example evaluation of the disclosed query object localization and extraction process.

FIGS. 11A through 11D graphically illustrate example query object localization and extraction process on a sports product image dataset.

FIGS. 12A through 12D graphically illustrate example query object localization and extraction process on an object category search dataset.

Figure 1:
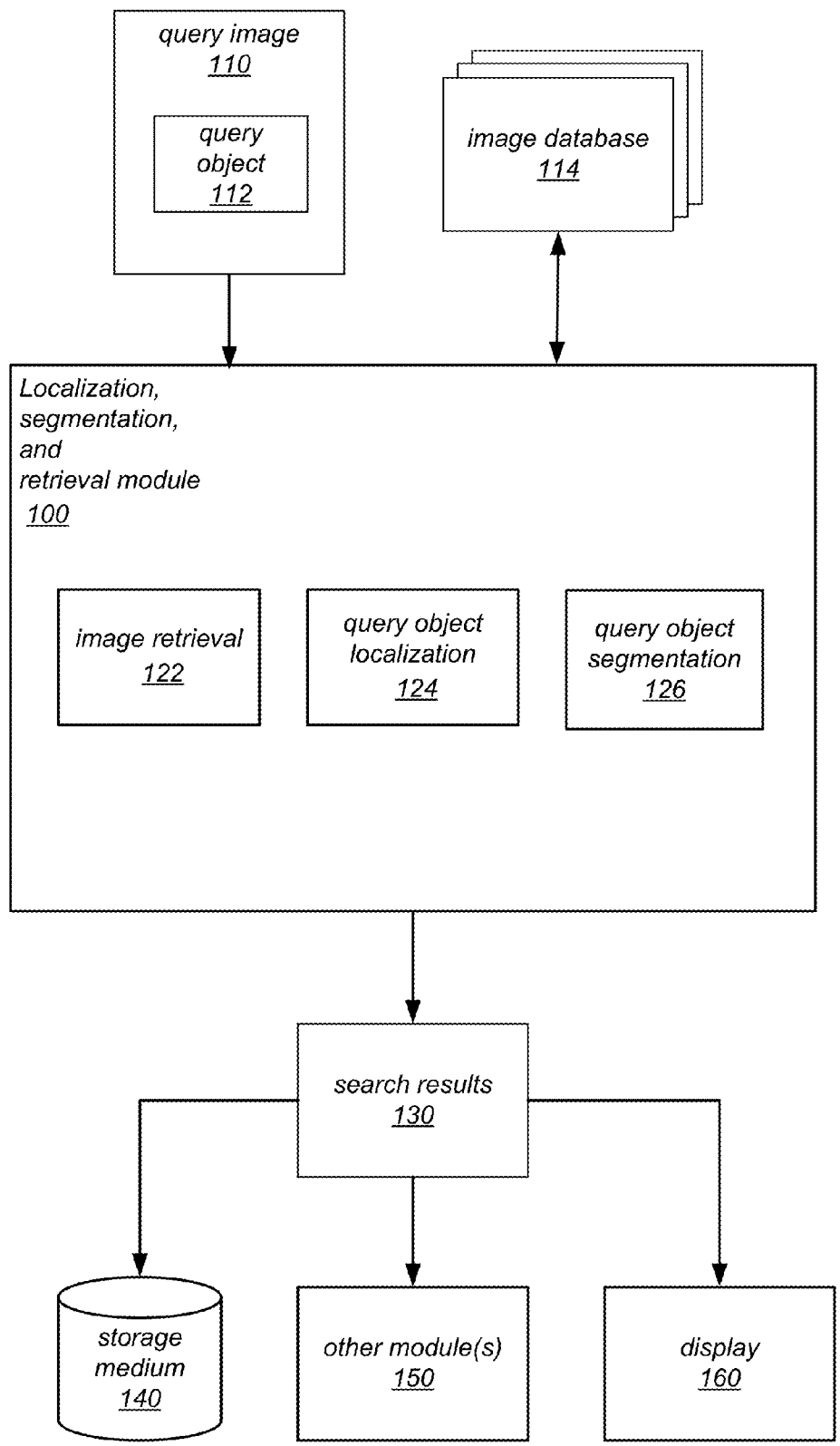
FIG. 1 illustrates a module that may implement embodiments of the disclosed retrieval method that implements a query object localization and segmentation technique, according to at least some embodiments.

While the disclosure is described herein by way of example for several embodiments and illustrative drawings, those skilled in the art will recognize that the disclosure is not limited to the embodiments or drawings described. It should be understood, that the drawings and detailed description thereto are not intended to limit the disclosure to the particular form disclosed, but on the contrary, the intention is to cover all modifications, equivalents and alternatives falling within the spirit and scope of the present disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

"First," "Second," etc. As used herein, these terms are used as labels for nouns that they precede, and do not imply any type of ordering (e.g., spatial, temporal, logical, etc.). For example, for images of a database of images, the terms "first" and "second" images can be used to refer to any two of the images. In other words, the "first" and "second" images are not limited to logical images 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Various embodiments for query object localization, segmentation, and image retrieval are described. Various examples and applications are also disclosed. Some embodiments may include a means for query object localization, segmentation, and/or image retrieval using the techniques as described herein. For example, a module may be provided that may implement an embodiment of the object query object localization, segmentation, and/or image retrieval technique. The module may, in some embodiments, be implemented by program instructions stored in a computer-readable storage medium and executable by one or more processors (e.g., one or more CPUs or GPUs) of a computing apparatus. The computer-readable storage medium may store program instructions executable by the one or more processors to cause the computing apparatus to perform the various techniques, as described herein. Other embodiments may be at least partially implemented by hardware circuitry and/or firmware stored, for example, in a non-volatile memory.

Although some embodiments are described as being implemented on an application (e.g., shopping application) implemented on a mobile device, the disclosed techniques may be used for other query object localization, segmentation, and image retrieval tasks as well. For example, the disclosed techniques may be used for image object localization, segmentation, and/or retrieval that is not implemented in a mobile and/or product image search application.

Turning now to FIG. 1, an illustrative localization, segmentation, and retrieval module that may implement various embodiments disclosed herein is shown. Localization, segmentation, and retrieval module 100 may be implemented as (or within) a stand-alone application or as a module of or plug-in for another application (e.g., web browser). Examples of types of applications in which embodiments of module 100 may be implemented may include, but are not limited to, image retrieval, image (including video) analysis, characterization, search, processing, and/or presentation applications, as well as applications in security or defense, educational, scientific, medical, publishing, digital photography, digital films, games, animation, marketing, and/or other applications in which image retrieval, analysis, characterization, representation, or presentation may be performed.

Module 100 may receive a query image 110 that includes a query object 112. In some embodiments, the location of query object 112 within query image 110 may be unspecified such that the location of the query object is unknown to module 110. Module 100 may retrieve one or more images from image database 114 according to the disclosed techniques. Note that image database 114 may be stored remotely from a system implementing module 100. For example, image database 114 may be stored on a server that is accessibly by module 100 over a network, such as the Internet. In various embodiments, image retrieval 122, of module 100, may identify and/or retrieve images from image database 114 based on respective spatially constrained similarity measures between query image 110 and the images from image database 114. In some embodiments, query object localization 124, of module 100, may estimate the location of the query object in the query image based on respective spatially constrained similarity measures between query image 110 and the images from image database 114. Query object segmentation 126, of module 100, may automatically segment the query object from the query image based on the estimated location, according to some embodiments. In some embodiments, the retrieval, localization, and segmentation may be iterated. Module 100 may display a user interface to which a user may, for example, specify inputs and/or parameters and via which progress and/or results may be displayed to the user. Module 100 may generate, as output, search results 130 that may indicate one or more images of image database 114 that are determined to be most similar to query object 112. Search results 130 may, for example, be stored to a storage medium 1040, such as system memory, a disk drive, DVD, CD, etc., displayed on a display 1060, and/or passed to one or more other modules 150 (not shown).

Figure 2:
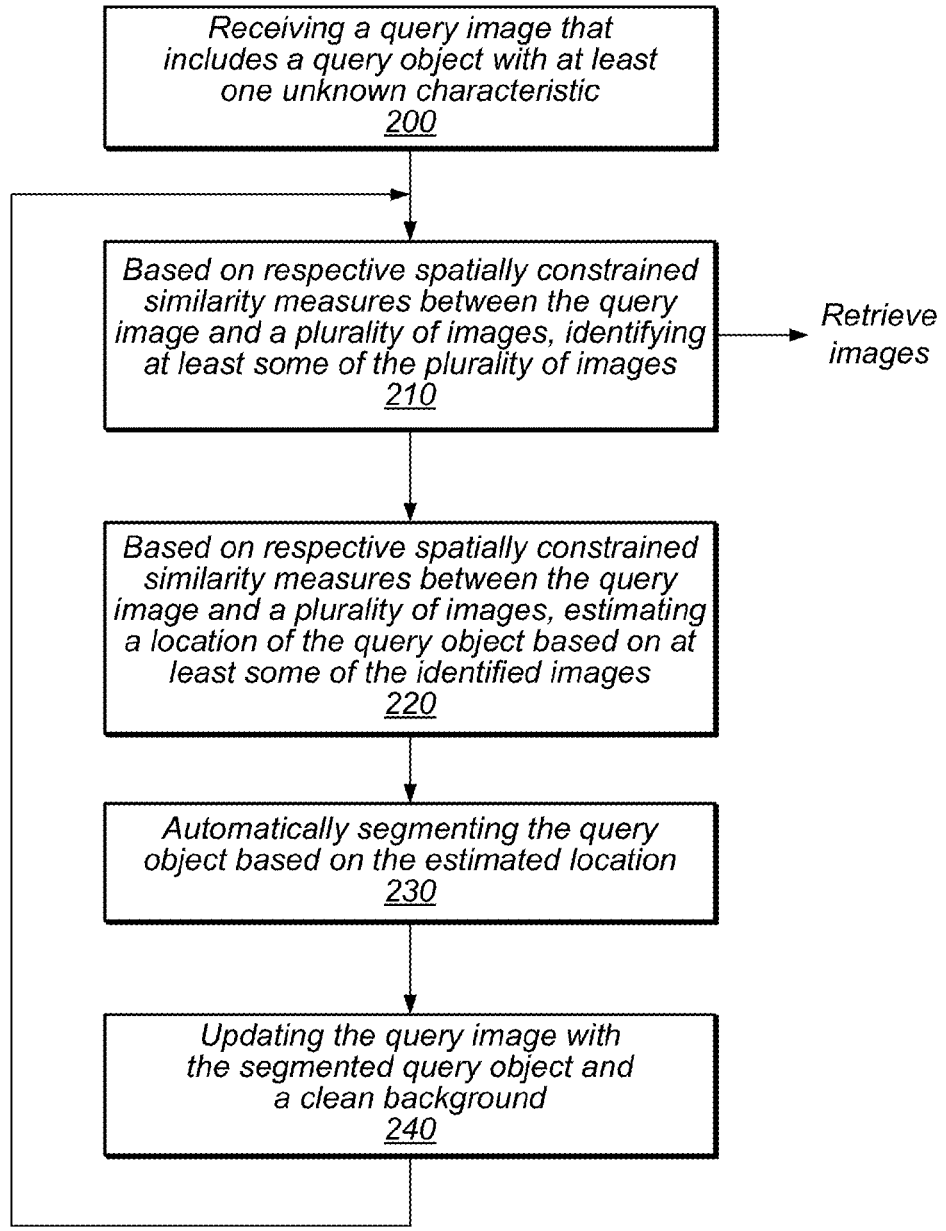
FIG. 2 is a flowchart for a retrieval method that implements a query object localization and segmentation technique, according to at least some embodiments.

Turning now to FIG. 2, one embodiment of a method for query object localization, segmentation, and image retrieval is illustrated. While the blocks are shown in a particular order for ease of understanding, other orders may be used. In some embodiments, the method of FIG. 2 may include additional (or fewer) blocks than shown. Blocks 200-240 may be performed automatically or may receive user input. In one embodiment, module 100, which may be implemented as an application (e.g., shopping application) executing on a mobile device, may perform the method of FIG. 2.

As shown at 200, a query image may be received. The query image may include a query object. The location of the query object may be unspecified such that the location of the query object may be unknown to module 100 and may not be received as input with the query image. In some embodiments, the scale and/or pose of the query object may also be unspecified. Query images may include non-planar, non-rigid, and/or less-textured objects. Example query images are shown in FIG. 4B. The example query images include a hat, shoes, a stuffed bear, and a jacket. In one embodiment, the query image may be taken with the camera of a mobile device (e.g., via an application executing on a mobile phone which may be the same as the application implementing the method of FIG. 2 or a different application). For instance, a user of the mobile device may be walking through the park and see someone wearing a pair of shoes that the user wishes to purchase. The user could take a picture of the shoes using a camera of the mobile device. The application may then receive that image as the query image at block 200.

Note that the example query images of FIG. 4B are taken under various different lighting conditions and have cluttered backgrounds (e.g., noisy, non-uniform color, etc.). The example query images may also vary in viewpoint when compared the standard viewpoint database images of FIG. 4A. For example, the database images of the shirts in FIG. 4A are uniformly taken from directly in front of the shirt, facing the shirt, whereas the query image hat of FIG. 4B is taken from above the hat at approximately a 45 degree angle. As another example, the shoes of the image database of FIG. 4A are each positioned with the heel at the left of the image and with the toe at the right of the image. One of the query image shoes is positioned similarly with the heel at the left and the toe at the right. However, the other query image of a shoe has the toe at the left and the heel at the right. Further, images captured by mobile devices may also include motion blur and/or out-of-focus blur that may not exist in images from the image database of FIG. 4A.

In other embodiments, the query image may be taken with an image capturing device separate from a mobile phone (e.g., a stand-alone digital camera). Query images taken with a digital camera may likewise have a cluttered background and may be from a different viewpoint from the uniform viewpoint of the images of the image database of FIG. 4A.

At 210, at least some of a plurality of images from an image database may be identified and/or retrieved. As mentioned above, example images of the image database are shown in FIG. 4A. The image database may be a product image database and/or may be a large-scale database. For instance, it may include thousands to millions of images. The images may be unlabeled (e.g., images that are not labeled by a known category). Using the example of FIG. 4A, the products may be shirts and shoes (among others not shown). The products may be products for sale (e.g., over the internet). In some embodiments, the image database may be accessible by an application on a mobile device. The image identification and/or retrieval at block 210 may be based on respective spatially constrained similarity measures between the query image and the plurality of images. Note that blocks 210 and 220 may be performed simultaneously such that visually similar images may be identified and/or retrieved (block 210) at the same time the query object is localized/identified in the query image (block 220).

In various embodiments, image identification and/or retrieval may include using local features, visual vocabulary, and inverted files. The query image may be denoted by Q and a given image from the image database may be denoted by D. Let $\{f_1, f_2, \ldots, f_m\}$ denote the local features extracted from Q and $\{g_1, g_2, \ldots, g_n\}$ denote the local features extracted from D. Given a transformation T, the similarity between Q and D may be referred to as a spatially constrained similarity measure and may be defined, in one embodiment, as:

$$S(Q, D \mid T) = \sum_{\substack{(f_i, g_j) \\ f_i \in Q, g_j \in D, w(f_i) = w(g_j) \\ \|T(L(f_i)) - L(g_j)\| < \varepsilon}} \frac{idf(w(f_i)) \cdot idf(w(g_j))}{tf_Q(w(f_i)) \cdot tf_D(w(g_j))} \quad (1)$$

where $w(f)$ is the assigned visual word for feature f, $L(f)=(x_f, y_f)$ is the 2D image location of feature f, and $T(L(f))$ is its location in D after the transformation. The spatial constraint $$\|T(L(f_i)) - L(g_j)\| < \varepsilon$$

means that, after transformation, the locations of two matched features should be sufficiently close (e.g., less than a tolerance parameter $\varepsilon$). Accordingly, matched feature pairs that violate that transformation may be filtered out, in some embodiments.

In equation 1, $idf(w(f))$ is the inverse document frequency of $w(f)$, and $tf_Q(w(f_i))$ is the term frequency (i.e. number of occurrence) of $w(f_i)$ in Q. Similarly, $tf_D(w(g_j))$ is the term frequency of $w(g_j)$ in D. This is a normalization term to penalize those visual words repeatedly appearing in the same image. When repeated patterns (e.g. building facades, windows, water waves, etc.) exist in an image, many features tend to be assigned to the same visual word. Such burstiness of visual words violates the assumption that visual words are emitted independently in the image, and therefore could corrupt the similarity measure. As an example, considering that m features in Q and n features in D are quantized to visual word k respectively, there will be m·n matched pairs between two images, some of which may also satisfy the spatial constraint, as they tend to appear in a local neighborhood. However, if features are directly matched without quantization, there should be at most min(m, n) matched pairs. In other words, most of these m·n pairs are invalid correspondences and would largely bias the similarity measure if no normalization is applied.

Equation 1 may be simplified to:

$$S(Q, D \mid T) = \sum_{k=1}^{N} \sum_{\substack{(f_i, g_j) \\ f_i \in Q, g_j \in D \\ w(f_i) = w(g_j) = k \\ \|T(L(f_i)) - L(g_j)\| < \varepsilon}} \frac{idf^2(k)}{tf_Q(k) \cdot tf_D(k)} \quad (2)$$

where N is the size of the vocabulary. k may denote the k-th visual word in the vocabulary. $w(f_i)=w(g_j)=k$ indicates that $f_i$ and $g_j$ are both assigned to visual word k. idf(k) is the inverse document frequency of k, and $tf_Q(k)$ and $tf_D(k)$ are the term frequencies of visual word k in Q and D respectively. $L(f) = (x_f, y_f)$ is the 2D image location of f.

For each image D of at least some of the database images (e.g., those sharing a common/matching feature with Q or those having a matching feature with Q above the threshold $\varepsilon$), the transformation with the highest similarity between that given D and Q may be given by:

$$T^* = \{R(\alpha^*), s^*, t^*\} = \arg\max_T S(Q, D \mid T). \quad (3)$$

The approximate optimal transformation T* (e.g., by maximizing the score for Eqn. 2) between Q and D may be obtained by a generalized Hough voting scheme. At the same time, the database images may be simultaneously ranked by the maximum scores of Eqn. 2.

As a result, $S^*(Q,D)=S(Q,D|T^*)$ is the similarity score between Q and D. In at least some embodiments, similarity scores may be calculated for some or all of the images in an image database, and some or all of the database images may then be ranked according to their similarity scores ($S^*(Q,D)$). Example database images that may not have T* or S* calculated include those images that do not share a common feature with Q or that do not share a common feature with Q within the tolerance threshold $\varepsilon$.

As illustrated at 220, the location of the query object in the query image may be estimated based on the identified images from 210. The location of the query object may be estimated based on respective spatially constrained similarity measures between the query image and the plurality of images, as in the identification/retrieval of images at 210. For example, the query object location, which may include a support map, may be estimated by aggregating votes from the top-identified/retrieved database images. The estimated object support map may then be used to generate a trimap by which the query object may then be segmented, as described in more detail below. As noted above, the image identification/retrieval and object localization may occur simultaneously or as part of the same sequence with respect to determining the spatially constrained similarity measures.

In one embodiment, the generalized Hough voting algorithm may be used to localize the object in the query. The spatial constraint $\|T(L(f_i))-L(g_j)\|<\varepsilon$ may be equivalent to $\|(L(f_i))-T^{-1}L(g_j)\|<\varepsilon$. To localize the object in the query image, the optimal $T^{*-1}$ may be found. $T^{-1}$ may be decomposed into rotation angle, scale factor, and translation.

The scale factor may be uniformly quantized to 4 bins in the range of ½ and 2, and a voting map indicating the probability of the object support pixels may be generated for each of the quantized scale factors.

The rotation angle space may be quantized to $n_R$ values between $0 \sim 2\pi$. In at least some embodiments, $n_R=4$ or 8, but other values may be used. Thus, the rotation angle space may be decomposed to $n_R$ discrete steps, e.g.:

$$\alpha = 0, \frac{2\pi}{n_R}, \frac{2*2\pi}{n_R}, \ldots, \frac{(n_R-1)*2\pi}{n_R}.$$

A graphical illustration of the object extraction process, using an example query image and example database images, is shown in FIGS. 5A-5F. Suppose that $w(f_i)=w(g_j)$ in FIGS. 5A and 5B. In this example, it is assumed that the product objects in the database images are mostly around the image center (note that this may not necessarily be the case in other examples). Therefore, the image center may also be considered as the object center c in D. Because $w(f_i)=w(g_j)$, given a certain scale factor s, if $(f_i,g_j)$ obeys the transformation $T^{-1}$, the object center in Q would be $L(f_i)+s\cdot\overrightarrow{L(g_i)c}$, where $\overrightarrow{L(g_i)c}$ denotes the vector from $L(g_i)$ to c in D. Therefore, a vote may be cast for each matched feature pair on the corresponding center location in Q, with voting score for the pair (f, g) defined as:

$$\text{Score}(k) = \frac{idf^2(k)}{tf_Q(k) \cdot tf_D(k)} \quad (4)$$

Figure 5A:
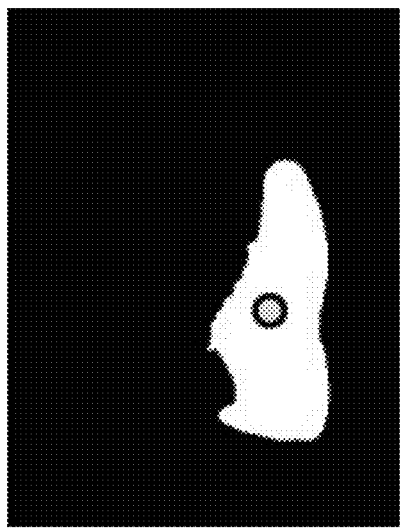
FIGS. 5A-5F illustrate an example processing of a query image and database image as part of a query object localization and extraction process, according to some embodiments.
Figure 5B:
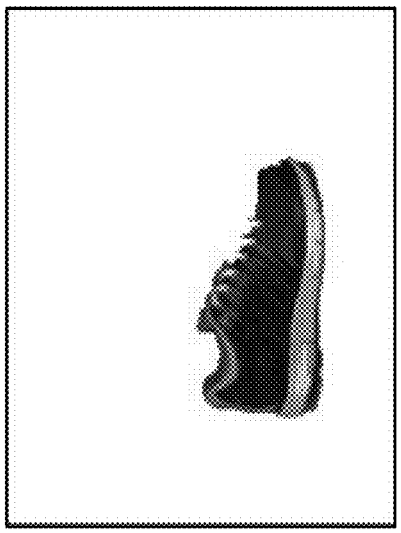

If all the $(f_i,g_i)$ pairs obey the same transformation, the voted object center may be very consistent as shown with $(f_i,g_i)(i=1,2,3)$ in FIGS. 5A and 5B. Accordingly, those features are spatially consistent. On the contrary, if a feature pair is not spatially consistent with others, it may vote for a different location (e.g., $(f_4,g_4)$ and $(f_5,g_5)$).

The cumulative votes of matched features (f, g) generate a voting map, in which each location represents a possible new object center associated with a certain translation t. After voting from all the matched feature pairs (or the matched feature pairs within the tolerance threshold), the location with the maximum score may be chosen as the estimated object center in Q. The maximum score at the estimated location may be the similarity measure defined above in Eqn. 2 given the pre-quantized scale factor s. The scale factor may be selected corresponding to the voting map that generates the largest maximum score. Note that, if matched feature pairs are spatially consistent, the center location they are voting should be similar. To choose the best translation T*, at least some embodiments may select the statistical mode in the voting map. Note that other methods may be used to determine the best translation in some embodiments.

In at least some embodiments, a best transformation T* may be achieved by finding the location with the highest score in all voting maps. Meanwhile, the best score serves as the similarity between the query and the database image, which is subsequently used for ranking of the given database image D. This scheme allows embodiments to simultaneously achieve object identification/retrieval and localization without sub-window search or post-processing.

Based on the above technique, each D may have a prediction of the object location in the query image, which can be characterized by a vector $[x_c, y_c, s]^T$, where $(x_c, y_c)$ is the location of the object center in the query image, and s is the relative scale factor between the query object compared with the object in D.

Figure 3:
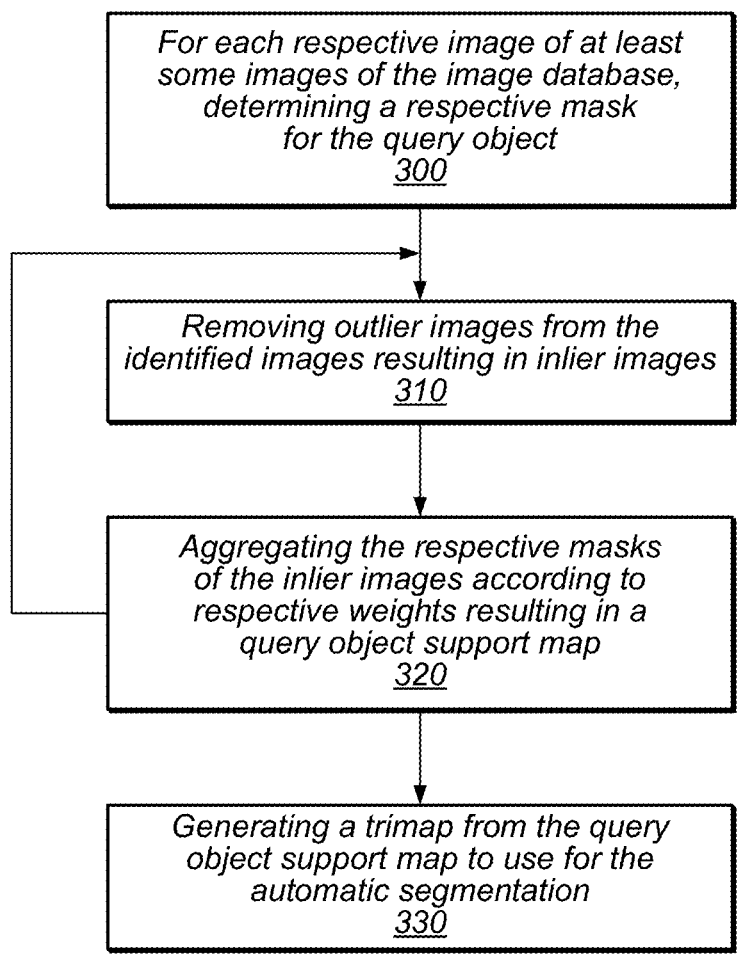
FIG. 3 is a flowchart for an object localization method, according to at least some embodiments.

FIG. 3 illustrates additional details regarding localizing the query object at block 220. As shown at 300, for each respective image of at least some images of the image database, a respective mask for the query object may be determined. For example, images for which a respective mask may be determined may be the top N identified and/or retrieved objects according to their ranking by similarity score. In another example, a mask may be determined for each image having a matching feature with the query image (e.g., a matching feature within the threshold or any matching feature).

Figure 5C:
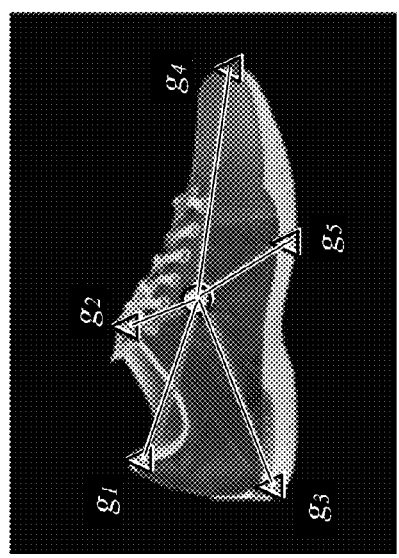

As noted above, in product image search, database images mostly have a clean background. The background color can be easily identified by finding the peak of the color histogram built upon the entire image. The mask of the object can then be obtained by comparing with the background color. Once the mask for the object in D is found, as well as the estimated query object location $[x_c, y_c, s]^T$, a transformed object mask can be voted at the estimated query location $(x_c, y_c)$ with scale factor s. An example of a voted object mask of D on the object support map of Q is shown in FIG. 5C.

In some embodiments, not all the top identified and/or retrieved images may correctly localize the query object, especially when irrelevant objects are identified and/or retrieved, as can be the case in a large-scale product database. Therefore, in some embodiments, outliers may be excluded as shown at 310. At 310, outlier images may be removed from the identified and/or retrieved images resulting in inlier images. In some embodiments, sophisticated outlier removal techniques, such as spatial verification using RANdom SAmple Consensus (RANSAC) can be used. However, such techniques may come with high computational costs and may not handle non-planar, non-rigid, and less textured objects very well.

Therefore, in other embodiments, location predictions $[x_c, y_c, s]^T$ may be used to remove outliers as follows. Consider that the top N identified and/or retrieved images are used to localize the query object, N location predictions are then obtained as $[x_c^i, y_c^i, s^i]^T$ (i=1 . . . N). Let $[\bar{x}_c, \bar{y}_c, \bar{s}]^T$ be the median values of all the predictions. For each $[x_c, y_c, s]^{Ti}$ if the squared distance $$D=(x_c^i-\bar{x}_c)^2+(y_c^i-\bar{y}_c)^2+\lambda(s_i-\bar{s})^2 > \tau \quad (5)$$

the corresponding database images may be removed from localization. In Eqn. 5, $\tau$ is a predefined threshold, and $\lambda$ is a weight parameter.

Figure 5D:
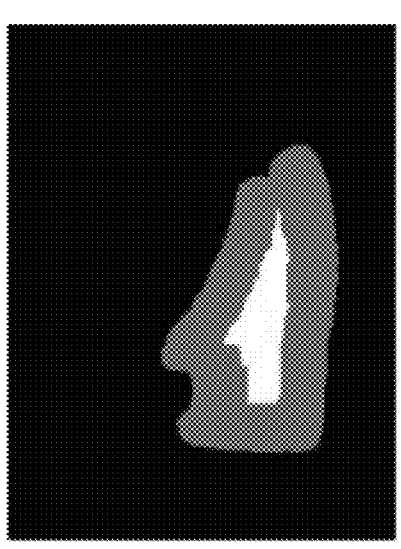

Once the outliers are removed, the respective masks of the inlier images may be aggregated resulting in a query object support map, as shown at 320. In some embodiments, the aggregation may be a weighted aggregation. For example, each inlier database image may accumulate a mask at the estimated location with a weight. As one example, the weight can be determined as the square root of the inverse of the rank. In such an example, more confidence is placed on votes from higher ranked images. As a result of the mask aggregation at block 320, a query object support map is generated. An example query object support map is illustrated in FIG. 5D.

As shown in FIG. 3, the output of block 320 may be fed back block 310 such that the outlier removal and vote aggregation process may be iterated to refine the object location and therefore also refine the query object support map. As a result of the iteration of blocks 310 and 320, the median values $[\bar{x}_c, \bar{y}_c, \bar{s}]^T$ may be updated after removing the outliers at each iteration.

FIGS. 6A-6C and 7A-7C illustrates two examples (shirt and bear) of localization of an object in the query image. FIGS. 6A and 7A show the query images as a shirt and a bear, respectively. FIGS. 6B and 7B show the top five identified and/or retrieved images from the image database for each of those query images, respectively. FIGS. 6C and 7C show the respective voted object support map for each of the two examples. Note that even when irrelevant objects are identified and/or retrieved (e.g., the mug and backpack in the top row, and the ball, backpack, and helmet in the bottom row), the local map can still accurately localize the object, while providing higher aggregated voting scores on the object support region. Even where irrelevant images dominate the top identification and/or retrieval results, such as in FIG. 7B, the estimated object support map (as in FIG. 7C) can still provide good predictions for the object location due to matches in the object boundary features.

Figure 5E:
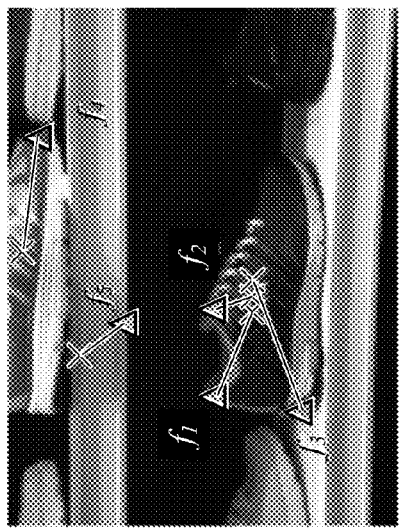

Turning back to the flowchart of FIG. 3, once the object support map is generated, it may be used to generate a trimap to use for automatic segmentation as illustrated at block 330. In one embodiment, the support map may be normalized to a gray-scale image. Dilation may then be performed on the normalized map. The pixels below an image intensity threshold (e.g., <50 for a normalized range of 0-255 for image intensity) may be set as background. Erosion may also be performed and the pixels above a high threshold (e.g., >200) may be set as foreground. All the other regions may be labeled as uncertain. An example trimap is shown in FIG. 5E. The black regions in FIG. 5E represent the background and the white and gray regions indicate the foreground and uncertain areas, respectively. In more challenging retrieval tasks (e.g., retrieving objects of the same semantic category but with large appearance changes as in FIGS. 6A-6C and 7A-7C), because shape information may not be obvious in the estimated support map, to avoid false foreground labeling, only the background and uncertain regions may be labeled in some embodiments.

Figure 5F:
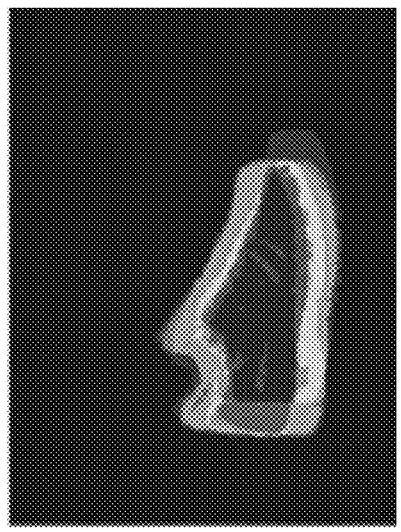

Returning to FIG. 2, block 230 shows that the query object may be automatically segmented from the query image based on the estimated location. In one embodiment, the trimap generated at block 330 of FIG. 3 may be provided to a segmentation algorithm (e.g., GrabCut) to automatically segment the query object. The segmentation algorithm may resolve the uncertain region into an exact boundary. Referring again to the example illustrated in FIGS. 5A-5F, the segmentation result of block 230 is shown in FIG. 5F.

As illustrated at 240, the query image may be updated with the segmented query object and a clean background. For example, the query object may be extracted and the query image may be filled with a constant color background (e.g., black, white, etc.). An example of the updated query image is the shoe of FIG. 5F.

One or more of blocks 210-240 may then be iterated on or more times based on the updated query image of block 240. At some point, as described at block 210, a final set of identified images may be retrieved/provided. For example, if a user of a mobile phone application is searching for shoes in the image database based on a query image taken of a shoe by the phone's camera, then one or more images, selected and retrieved according to the disclosed techniques, may be presented on the phone's display. This may occur after a single iteration, five iterations, a time-based number of iterations (e.g., after 10 seconds), or a number of iterations that results in an identified image set below a threshold number (e.g., five or fewer images). One to two iterations may typically yield much improved retrieval, localization, and segmentation results.

The disclosed techniques may provide for improved image search. Robust query object localization may serve as a good prior for segmentation, and good object segmentation may allow for more accurate retrieval by using the spatially constrained model and reducing the influence of background clutter. Moreover, by iterating the retrieval/localization, background influence is reduced thereby yielding improved search results. The refined search results may then be used to improve the query object localization and segmentation. Accordingly, the iterative and interleaved performance of the object extraction and object retrieval forms a closed-loop adaptation between query object extraction and object retrieval. Further, the simultaneous segmentation and retrieval techniques may even be effective for fine-grained product identification issues (e.g., different shoes often differ by only a very small amount in appearance).

EXAMPLES

Figure 9A:
FIGS. 9A and 9B illustrate other example database images and query images, respectively, that were used in another example evaluation of the disclosed query object localization and extraction process.

The disclosed techniques were evaluated on two example product image datasets. The first example product image dataset is a large, real-world product image database in which identical object retrieval was attempted. Examples from that dataset are shown in FIG. 8A. The second example image dataset was used for object category retrieval. Examples from the second dataset are shown in FIG. 9A.

On the two example datasets, a BOW retrieval method, a state-of-the-art spatial model, query extraction by GrabCut with manual initialization, and the disclosed techniques were evaluated. The results of the two example evaluations are compared in terms segmentation and retrieval accuracy and show that the disclosed techniques yield even better segmentation results than manual segmentation with a bounding rectangle as initialization. Moreover, the results indicate that the disclosed retrieval techniques significantly outperform other retrieval techniques.

First Example Evaluation

The first example dataset is a real-world sports product image (SPI) dataset, with ten categories (hats, shirts, trousers, shoes, socks, gloves, balls, bags, neckerchief, and bands). The SPI dataset included 43,953 catalog images. The objects in the database images are all well align, with clean backgrounds. FIG. 8A illustrates some examples of the SPI dataset.

In the example evaluation of the various techniques using the first dataset, 67 query images were captured with a mobile phone in local stores under various backgrounds, illumination, and viewpoints. Each of the objects in the query images is a shoe, and each has one exact same instance in the database. FIG. 8B illustrates examples of query images from the database. Note that the SPI database includes 5925 catalog images in the shoe category. In the example evaluation, it was attempted to retrieve the same product corresponding to the query image from the database images. Cumulative Match Characteristic Curve (CMC) was used for performance evaluation because it is equivalent to a 1:1 identification problem.

Combined sparse and dense SIFT descriptors were used as features and hierarchical k-means clustering was used to build the vocabulary. Sparse SIFT features were computed from DoG interest regions and dense SIFT features were computed from densely sampled regions in multiple scales across the image frame. Dense features may be useful for non-textured objects. SIFT descriptors were computed with the gravity constraint. That is, the SIFT features were extracted at a constant orientation. The vocabulary on the SPI dataset has 10,580 visual words and is used throughout the evaluations in the first example. The top ten retrieved database images were used for the query object localization.

Figure 10A:
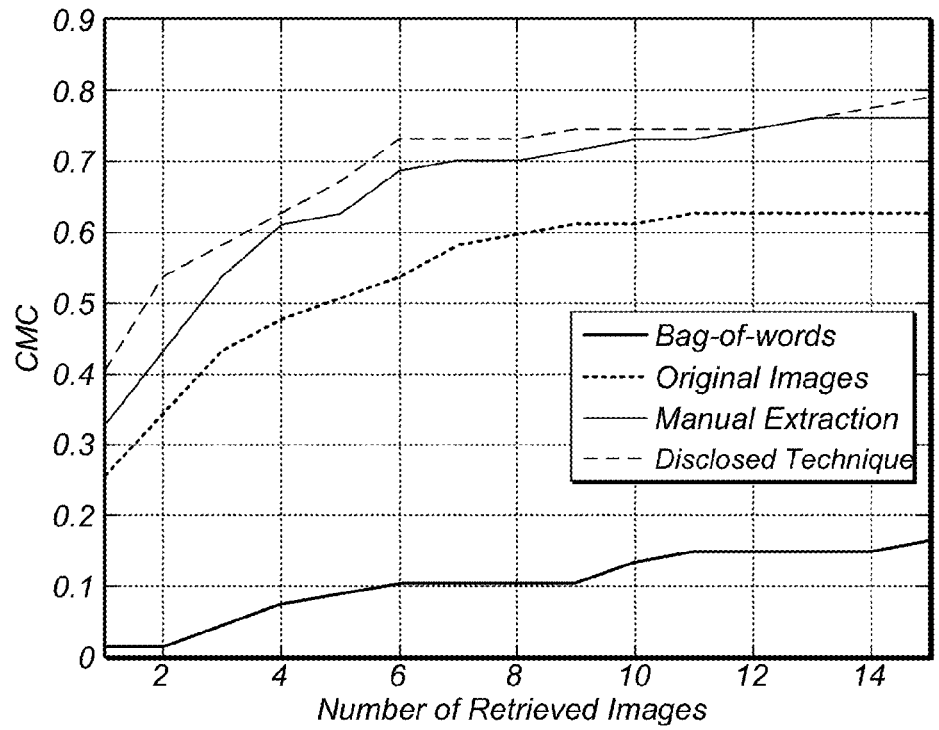
FIGS. 10A and 10B illustrate a graphical illustration of two example evaluations of the disclosed query object localization and extraction process.

The disclosed techniques were compared with the baseline BOW method and a spatially-constrained model with original query images. For the spatially-constrained model, the query object was manually segmented using GrabCut with a bounding rectangle as initialized. The extracted object was then used to perform the search. FIG. 10A shows the CMC for all the compared techniques. The x-axis indicates the number of retrieved images k, and the y-axis indicates the probabilities that the correct catalog object appears in the top k retrieved images.

The results show that the standard BOW model cannot retrieve the correct object well for mobile product images. The spatially-constrained model removes some falsely matched features by more precise spatial matching thereby improving on the BOW model. However, it is still affected by the features extracted from the background and the object/background boundaries. In contrast, the disclosed technique, by automatically extracting the query object, further improves the performance and even outperforms the retrieve approach with manually initialized query object segmentation. According to the disclosed techniques, 40% of the query images rank the correct catalog object at the top 1, while the percentages for manual extraction and using original images are 32.8% and 25.3%, respectively. When the top 6 retrieved images are considered, 73% of the query images have their correct catalog object ranked in the top 6 according to the disclosed techniques. The CMC curve only shows the results for the top 15, as images with low ranks are typically less important in most applications. There are still 20% of queries that cannot retrieve their relevant images in the top 15. This is because the viewpoint, lighting condition, and image resolution are too different between the query and the database images.

FIGS. 11A-11D show some examples of query object extraction on the image database of FIGS. 8A-8B according to the disclosed techniques. As shown, the object support maps accurately indicate the object regions, even where there is some noise from irrelevant objects (e.g., an example is shown in the second row of FIGS. 11A-11D). As a result, the query object may be accurately extracted and, in many cases, achieve more accurate performance than manually initialized segmentation.

Second Example Evaluation

Figure 9B:
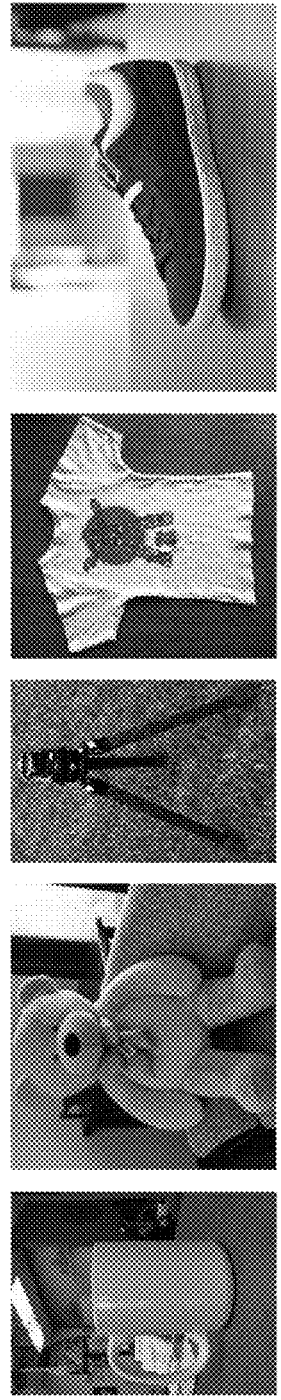

The other dataset is an object category search (OCS) dataset. Given a single query object, objects with the same semantic category need to be retrieved from the database. The dataset included 868 clean background product images in which the respective objects were positioned at the image center. 60 query images were collected from 6 categories from the internet with each category having 10 query images. The query images contain background clutter and the objects have large appearance differences making it a challenging task for object retrieval. FIGS. 9A-9B illustrates some example query and database images from the second example dataset. The number of relevant database images for the 6 categories ranges from 18 to 53. Average precision at rank k (e.g., the percentage of relevant images in the top-k retrieved images) is used to evaluate the performance on this dataset.

Figure 10B:
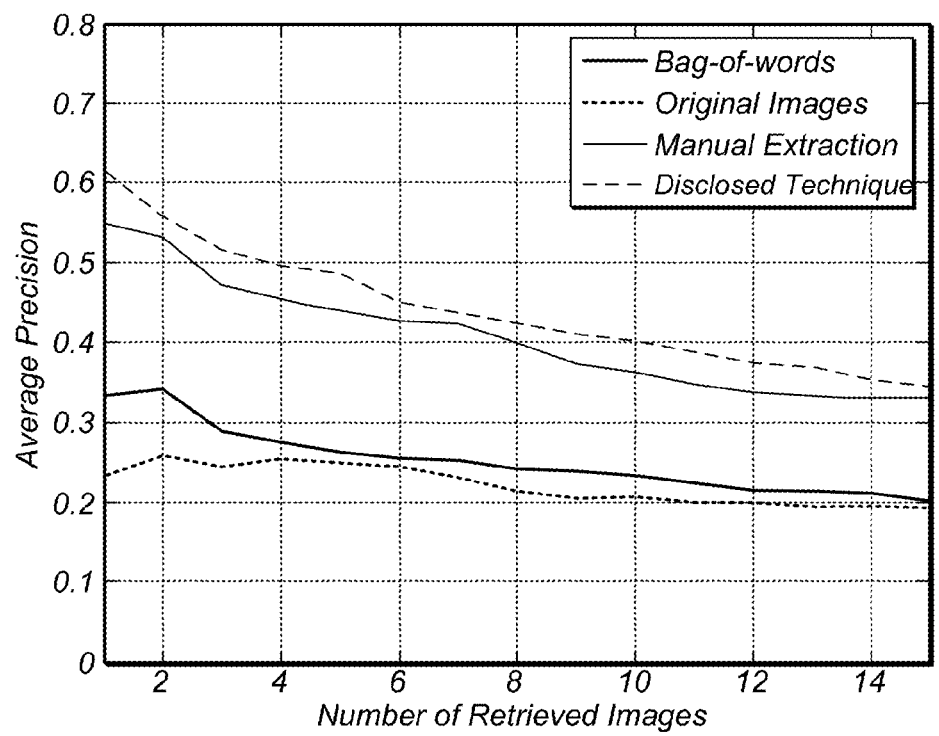

The implementation of the evaluation on this dataset was performed similarly to the evaluation on the SPI dataset. FIG. 10B shows the average precision at rank k (e.g., the average percentage of relevant objects appearing in the top-k retrieved images) for all four of the compared methods.

In this dataset, the appearance variation is very large within one category. As a result, the spatially-constrained model, which is mainly targeted for instance retrieval instead of object category retrieval, is not sufficient. As shown in FIG. 10B, the performance of the spatial model is slightly worse than the BOW model. The average precision is dramatically improved as shown in FIG. 10B. Similar to the SPI search dataset, the disclosed method produces better retrieval performance than manual query object extraction, which demonstrates the effectiveness of the disclosed method on this challenging task.

Some examples of query object extraction are shown in FIGS. 12A-12B. It is shown that, when the object appearance does not change significantly within the semantic category, the object support map can accurately estimate the query object regions (top two rows). Meanwhile, when the appearance variation is large and the initial search results can be very noisy, although no shape information can be reliably estimated, the query object can still be accurately localized (examples from bottom two rows of FIGS. 12A-12B). As a result, comparable segmentation results to the manually initialized extraction method can be obtained.

Compared with the BOW model, the additional storage in the indexing file is the location for each feature, which can be encoded by a 1-byte integer. Therefore, the additional storage for the SPI dataset with 45 k images is less than 2 MB. The additional memory cost in the retrieval process is the voting maps for each database image when optimizing $T^{-1}$, which has the size of 16×16 with floating values. When 4 scale bins are used (e.g., generating 4 voting maps for each database image), the additional memory cost for the 45 k-image dataset is much less than the size of the inverted file. Because multiple iterations of search may be performed, the retrieval time would be multiple times of the initial search time, but the absolute retrieval time is still very short. The most time-consuming portion of the method is the GrabCut segmentation. However, the disclosed method can still perform the whole process for each query within 3 seconds on a database with 45 k images without additional code optimization.

Example System

Figure 13:
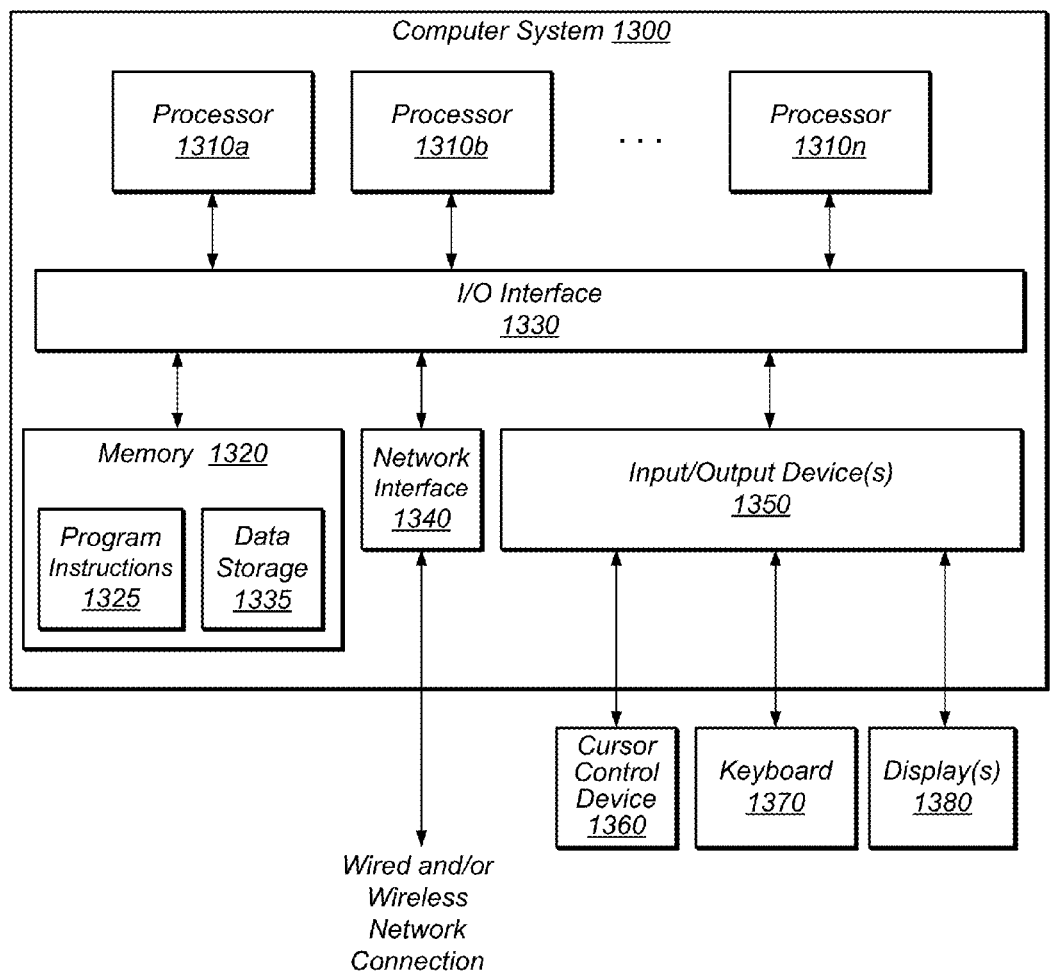
FIG. 13 illustrates an example computer system that may be used in embodiments.

Embodiments of the object retrieval, localization, and automatic segmentation technique as described herein may be executed on one or more computer systems, which may interact with various other devices. One such computer system is illustrated by FIG. 13. In different embodiments, computer system 1300 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1300 includes one or more processors 1310 coupled to a system memory 1320 via an input/output (I/O) interface 1330. Computer system 1300 further includes a network interface 1340 coupled to I/O interface 1330, and one or more input/output devices 1350, such as cursor control device 1360, keyboard 1370, and display(s) 1380. In some embodiments, it is contemplated that embodiments may be implemented using a single instance of computer system 1300, while in other embodiments multiple such systems, or multiple nodes making up computer system 1300, may be configured to host different portions or instances of embodiments. For example, in one embodiment some elements may be implemented via one or more nodes of computer system 1300 that are distinct from those nodes implementing other elements.

In various embodiments, computer system 1300 may be a uniprocessor system including one processor 1310, or a multiprocessor system including several processors 1310 (e.g., two, four, eight, or another suitable number). Processor(s) 1310 may be any suitable processor capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA.

In some embodiments, at least one processor 1310 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the object retrieval, localization, and automatic segmentation techniques disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1320 may be configured to store program instructions and/or data accessible by processor(s) 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the object retrieval, localization, and automatic segmentation techniques as described herein are shown stored within system memory 1320 as program instructions 1325 and data storage 1335, respectively. In other embodiments, program instructions and/or data may be received, sent or stored upon different types of computer-accessible media or on similar media separate from system memory 1320 or computer system 1300. Generally speaking, a computer-accessible medium may include storage media or memory media such as magnetic or optical media, e.g., disk or CD/DVD-ROM coupled to computer system 1300 via I/O interface 1330. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1340.

In one embodiment, I/O interface 1330 may be configured to coordinate I/O traffic between processor(s) 1310, system memory 1320, and any peripheral devices in the device, including network interface 1340 or other peripheral interfaces, such as input/output devices 1350. In some embodiments, I/O interface 1330 may perform any necessary protocol, timing or other data transformations to convert data signals from one component (e.g., system memory 1320) into a format suitable for use by another component (e.g., processor(s) 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. In addition, in some embodiments some or all of the functionality of I/O interface 1330, such as an interface to system memory 1320, may be incorporated directly into processor(s) 1310.

Network interface 1340 may be configured to allow data to be exchanged between computer system 1300 and other devices attached to a network, such as other computer systems, or between nodes of computer system 1300. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1350 may, in some embodiments, include one or more display terminals, keyboards, keypads, touchpads, scanning devices, voice or optical recognition devices, or any other devices suitable for entering or retrieving data by one or more computer system 1300. Multiple input/output devices 1350 may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1340.

As shown in FIG. 13, memory 1320 may include program instructions 1325, configured to implement embodiments of the object retrieval, localization, and automatic segmentation techniques as described herein, and data storage 1335, comprising various data accessible by program instructions 1325. In one embodiment, program instructions 1325 may include software elements of embodiments of the object retrieval, localization, and automatic segmentation techniques as described herein and as illustrated in the Figures. Data storage 1335 may include data that may be used in embodiments. In other embodiments, other or different software elements and data may be included.

Those skilled in the art will appreciate that computer system 1300 is merely illustrative and is not intended to limit the scope of the object retrieval, localization, and automatic segmentation techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present disclosure may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the embodiments embrace all such modifications and changes and, accordingly, the above description to be regarded in an illustrative rather than a restrictive sense.

What is claimed is:
1. A method, comprising:
performing, by one or more processors of a computing device:
receiving a query image that includes a query object, a location of the query object in the query image being unspecified;
retrieving a plurality of images from an image database based on respective spatially constrained similarity measures between the query image and the plurality of images from the image database, said retrieving comprising at least:
identifying at least some of the plurality of images from the image database, the at least some images sharing a common feature with the query image; and estimating the location of the query object in the query image based on the identified at least some images, said estimating the query object including determining a mask for the query object, the mask having a voted center of the query object and the mask configured to differentiate the query object from a background of the query image; and automatically segmenting the query object from the query image based on the estimated location.

2. The method of claim 1, further comprising:

updating the query image with the segmented query object and a clean background; and repeating said identifying a plurality of images based on the updated query image, wherein said repeating said identifying includes retrieving the identified plurality of images based on the updated query image.

3. The method of claim 2, further comprising:

iteratively performing said estimating, said automatically segmenting, said updating, and said identifying.

4. The method of claim 1, wherein said estimating the location of the query object includes, for each respective image of the at least some images, determining a respective mask for the query object.

5. The method of claim 4, said determining the respective mask for the query object includes, for each respective image of the at least some images, voting on the center of the query object based on matched feature pairs between the respective image and the query image resulting in the respective mask of the query object for the respective image.

6. The method of claim 4, wherein said estimating the location of the query object includes:

removing outlier images from the retrieved images resulting in inlier images; and aggregating the respective masks of the inlier images according to respective weights resulting in a query object support map.

7. The method of claim 6, wherein said estimating the location of the query object further includes:

updating the inlier images by iteratively performing said removing outlier images and said aggregating the respective masks resulting in a refined query object support map.

8. The method of claim 6, wherein the weights are based on a ranking of the inlier images according to their respective spatially constrained similarity measures.

9. The method of claim 4, wherein said estimating the location of the query object further includes:

generating a query object support map from at least some of the respective masks, wherein the query object support map indicates a region of the query object; and generating a trimap from the query object support map to use in said automatically segmenting.

10. The method of claim 1, wherein said identifying at least some of the plurality of images from the image database includes:

determining a respective transformation for each of the at least some images based on a maximization of each of the respective spatially constrained similarity measures;

wherein said estimating the location of the query object is based on at least some of the respective transformations.

11. The method of claim 1, wherein the query image is obtained by a mobile device configured as the computing device.

12. The method of claim 1, wherein the plurality of images in the image database include multiple different categories of images.

13. A non-transitory computer-readable storage medium comprising stored program instructions that are computer-executable to implement a computing device performing operations comprising:

receiving a query image that includes a query object, a location of the query object in the query image being unspecified;

based on respective spatially constrained similarity measures between the query image and a plurality of images from an image database:

identifying at least some of the plurality of images from the image database, the at least some images sharing a common feature with the query image; and estimating the location of the query object in the query image based on the identified at least some images, said estimating the query object including determining a mask for the query object, the mask having a voted center of the query object and the mask configured to differentiate the query object from a background of the query image; and automatically segmenting the query object from the query image based on the estimated location.

14. The non-transitory computer-readable storage medium of claim 13, wherein the program instructions are further computer-executable to implement:

updating the query image with the segmented query object and a clean background;

repeating said identifying a plurality of images based on the updated query image, wherein said repeating said identifying includes retrieving the identified plurality of images based on the updated query image; and iteratively performing said estimating, said automatically segmenting, said updating, and said identifying.

15. The non-transitory computer-readable storage medium of claim 13, wherein said estimating the location of the query object includes:

for each respective image of the at least some images, determining a respective mask for the query object;

generating a query object support map from at least some of the respective masks, wherein the query object support map indicates a region of the query object; and generating a trimap from the query object support map to use in said automatically segmenting.

16. The non-transitory computer-readable storage medium of claim 15, wherein said generating a query object support map from at least some of the respective masks includes generating the query object support map from the masks corresponding to inlier images.

17. A system, comprising:

one or more processors; and a memory comprising program instructions that are executable by the one or more processors to:

receive a query image that includes a query object, a location of the query object in the query image being unspecified;

based on respective spatially constrained similarity measures between the query image and a plurality of images from an image database:

identify at least some of the plurality of images from the image database, the at least some images sharing a common feature with the query image; and estimate the location of the query object in the query image based on the identified at least some images, the estimate of the location of the query object including a determination of a mask for the query object, the mask having a voted center of the query object and the mask configured to differentiate the query object from a background of the query image; and automatically segment the query object from the query image based on the estimated location.

18. The system of claim 17, wherein the program instructions are further executable to:

update the query image with the segmented query object and a clean background;

repeat to identify the at least some plurality of images based on the updated query image, wherein said repeat to identify includes to retrieve the identified plurality of images based on the updated query image; and iteratively perform to said estimate, said automatically segment, said update, and said identify.

19. The system of claim 17, wherein to said estimate the location of the query object, the program instructions are further executable to:

for each respective image of the at least some images, determine a respective mask for the query object;

generate a query object support map from at least some of the respective masks, wherein the query object support map indicates a region of the query object; and generate a trimap from the query object support map to use in said automatically segmenting.

20. The system of claim 17, wherein to said generate a query object support map from at least some of the respective masks, the program instructions are further to generate the query object support map from the masks corresponding to inlier images.

* * * * *